(12) United States Patent  (10) Patent No.: US 7,390,280 B2
Duitsman et al.  (45) Date of Patent: Jun. 24, 2008

(54) MODEL VEHICLE TRANSMISSION SYSTEM

(75) Inventors: Gregory Paul Duitsman, Mahomet, IL (US); Richard Arlin Vessell, Rantoul, IL (US)

(73) Assignee: Hobbico, Inc., Champaign, IL (US)

( * ) Notice: Subject to any disclaimer, the term of this patent is extended or adjusted under 35 U.S.C. 154(b) by 262 days.

(21) Appl. No.: 11/137,734

(22) Filed: May 25, 2005

(65) Prior Publication Data

US 2006/0270505 A1 Nov. 30, 2006

(51) Int. Cl.
*F16H 63/30* (2006.01)
(52) U.S. Cl. .................. 475/306; 475/326; 475/336; 74/404
(58) Field of Classification Search .............. 475/306, 475/326, 336, 323; 446/443; 74/404
See application file for complete search history.

(56) References Cited

U.S. PATENT DOCUMENTS

| 513,363 | A | * | 1/1894 | Hartley | 74/404 |
|---|---|---|---|---|---|
| 801,323 | A | * | 10/1905 | Kiser et al. | 475/324 |
| 2,910,893 | A | * | 11/1959 | Lucien | 475/303 |
| 3,005,360 | A | * | 10/1961 | Carlson | 475/299 |
| 3,813,812 | A | | 6/1974 | Barlow et al. | |
| 4,502,353 | A | * | 3/1985 | Beaudoin | 475/298 |
| 4,518,057 | A | * | 5/1985 | McCallum | 180/210 |
| 5,401,201 | A | * | 3/1995 | Muraki | 446/409 |
| 5,503,586 | A | | 4/1996 | Suto | |
| 6,367,345 | B1 | | 4/2002 | Yeh | |
| 6,589,098 | B2 | | 7/2003 | Lee et al. | |
| 6,732,602 | B2 | | 5/2004 | Lu | |
| 2001/0004578 | A1 | | 6/2001 | Jaffe | |
| 2001/0027078 | A1 | | 10/2001 | Lee | |
| 2003/0029260 | A1 | * | 2/2003 | Kawahara | 74/333 |
| 2003/0236121 | A1 | | 12/2003 | Byers | |

FOREIGN PATENT DOCUMENTS

WO 89/07210 * 8/1989

* cited by examiner

*Primary Examiner*—Sherry Estremsky
(74) *Attorney, Agent, or Firm*—Drinker Biddle & Reath LLP (57) ABSTRACT

The present invention provides a transmission capable of providing a forward and a reverse drive for a model vehicle. The transmission comprises a drive gear and at least one transfer gear which is capable of engaging the drive gear. The at least one transfer gear is contained within a gear housing. An output gear is coupled to an output shaft, and the output gear is capable of engaging the at least one transfer gear. The transmission also comprises a locker ring capable of receiving the output gear and a shift lever assembly which is coupled to the locker ring. The shift lever assembly is also capable of engaging the gear housing. The invention also provides a method of changing a direction of travel of a vehicle and a system for controlling a direction of travel of a vehicle.

13 Claims, 11 Drawing Sheets

MODEL VEHICLE TRANSMISSION SYSTEM

FIELD OF THE INVENTION

This invention pertains to vehicle transmission systems, and more particularly to a transmission system for a model vehicle.

BACKGROUND OF THE INVENTION

Model vehicles, which are reduced-scale versions of full-size vehicles, are well known entertainment devices. Model vehicles such as automobiles, airplanes, trains and boats which are radio-controlled or battery-operated toys are generally available. With respect to model automobiles, it is preferable to be able to direct the model to travel in both the forward and reverse directions in order to more accurately simulate the performance of a full-size automobile. Furthermore, if the model automobile cannot be driven in reverse, it is likely to become trapped in corners or stuck in place whenever it encounters an obstacle in its path thereby limiting one's playing enjoyment.

Conventional transmission devices which allow a model vehicle to be operated in either a forward direction or a reverse direction are known. For example, a conventional transmission device which allows for the operation of a model vehicle in a forward or reverse direction by employing multiple gears which fully disengage is known. Also, conventional reversing transmissions exist which utilize "intermeshing" driveline gears. U.S. Pat. No. 6,367,345 (Yeh) discloses one such method. Yeh requires the use of two clutches that rotate in opposite directions and are coupled to the main drive shaft. Other systems require the use of multiple driveline gears, as disclosed in U.S. Pat. No. 6,732,602 (Lu), or multiple motors, as disclosed in U.S. Patent Publication No. 2001/0027078 (Lee et al.).

Problems exist with conventional transmission methods and devices, however. For example, when employing the conventional methods, gears are easily damaged and may be under a lot of stress. In systems where gears must be disengaged, the systems tend to fail easily or tend to be difficult to shift from forward to reverse. Additionally, the drive trains in conventional transmission devices are generally not durable. For these reasons, a transmission system that uses fewer moving parts and gears would be an important improvement in the art.

BRIEF SUMMARY OF THE INVENTION

The invention provides a transmission system which is capable of operating a vehicle, in particular a model vehicle, in either a forward or reverse direction. The transmission assembly is comprised of at least one transfer gear capable of engaging a drive gear, wherein the at least one transfer gear is contained within a gear housing. In addition, the assembly comprises an output gear coupled to an output shaft and capable of engaging the at least one transfer gear. The assembly further comprises a locker ring capable of receiving the output gear and a shift lever assembly that is coupled to the locker ring and is capable of engaging the gear housing.

DETAILED DESCRIPTION OF THE INVENTION

As shown in FIGS. 1-9, the invention is directed to a transmission 10 capable of providing a forward and a reverse drive for a model vehicle 52. The transmission 10 includes a drive gear 12 and at least one transfer gear 14 which is capable of engaging the drive gear 12. The at least one transfer gear 14 is contained within a gear housing 16. An output gear 18 is coupled to an output shaft 20, the output gear 18 being capable of engaging the at least one transfer gear 14 housed within the gear housing 16. The transmission 10 also includes a locker ring 22 capable of receiving the output gear 18, and a shift lever assembly 24 coupled to the locker ring 22, whereby the shift lever assembly 24 is capable of engaging the gear housing 16.

Figure 9:
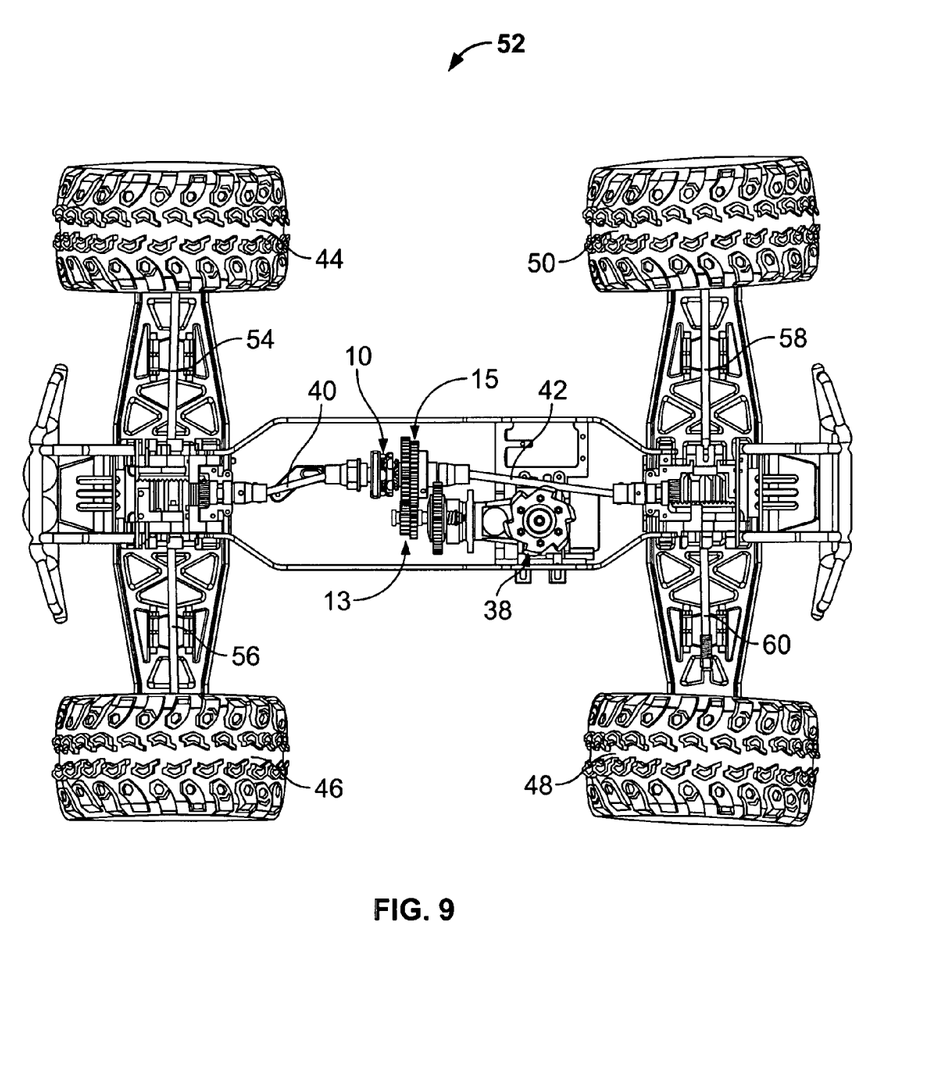
FIG. 9 is a top view of a base of a model vehicle showing the transmission system placed in relation to the front and rear axles.

When the transmission 10 is in operation, the drive gear 12 is coupled to a power input 38. As shown in FIG. 9, the power input may be, for example, a battery-powered motor, a small internal combustion engine such as a glow engine, or another type of motor. The transmission 10 may be placed in any suitable position, including a central position approximately equidistant from each of the vehicle's wheels.

Figure 7:
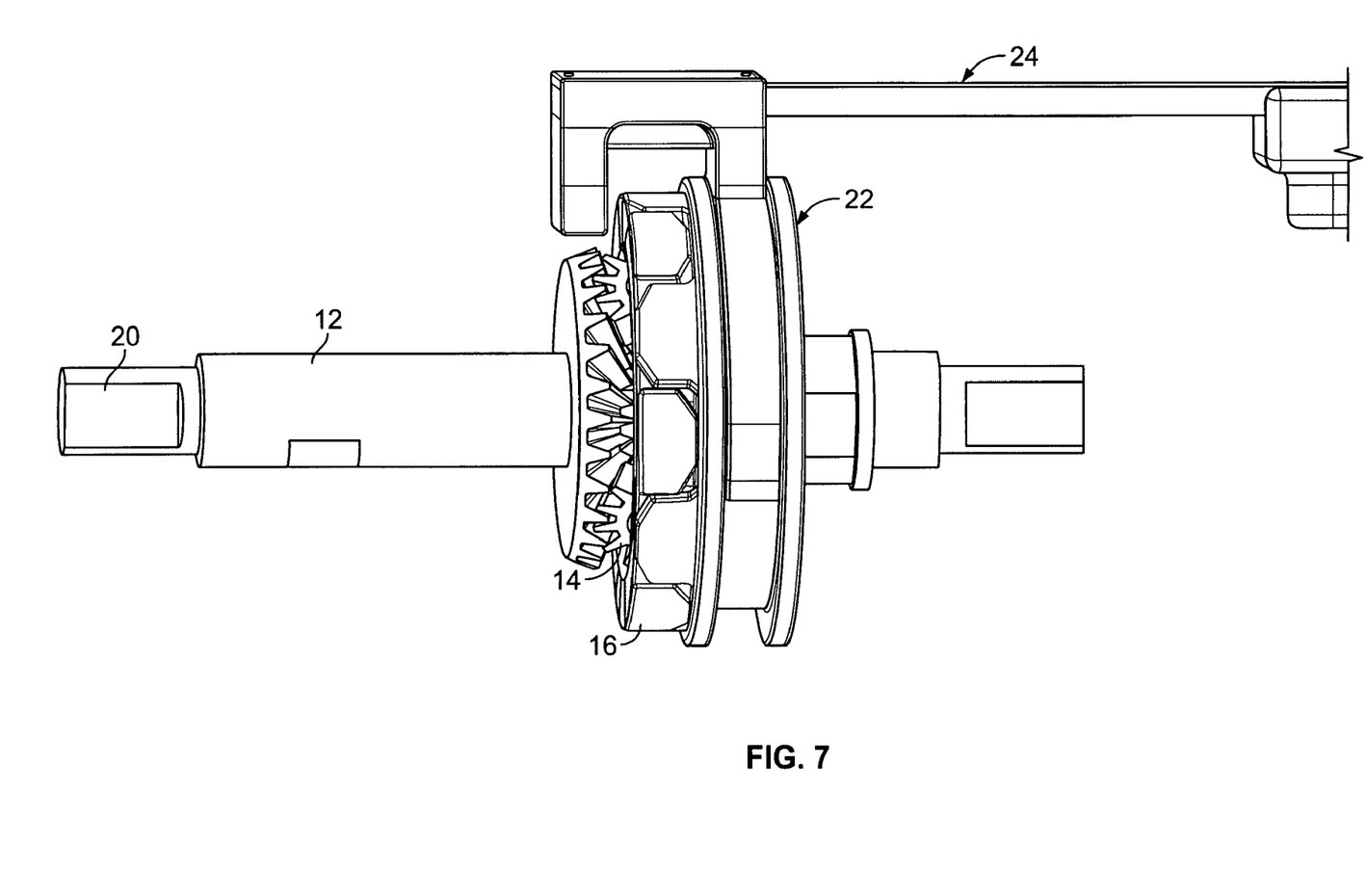
FIG. 7 is a schematic view of the transmission system in the "forward" position.
Figure 7A:
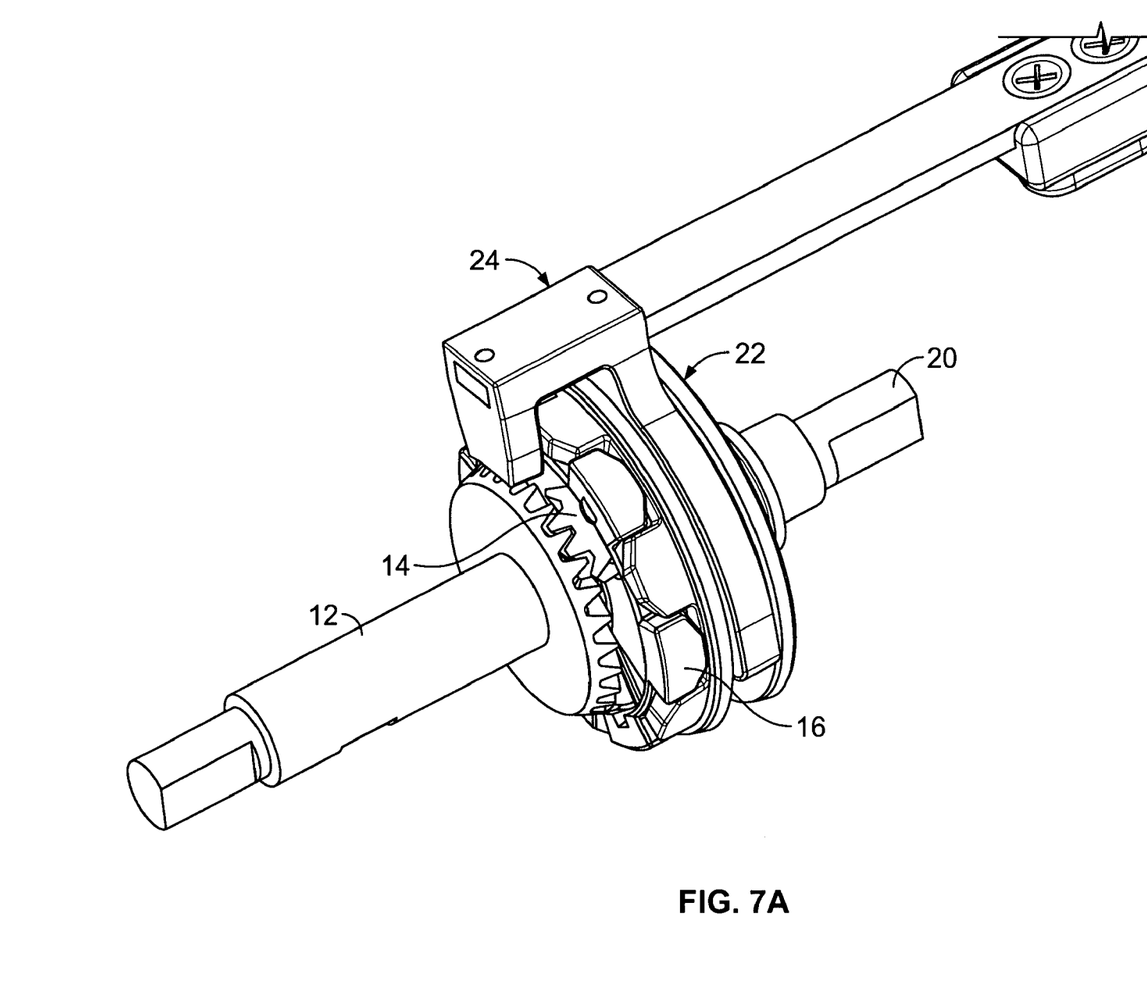
FIG. 7A is a perspective view of the transmission system in the "forward" position.
Figure 8:
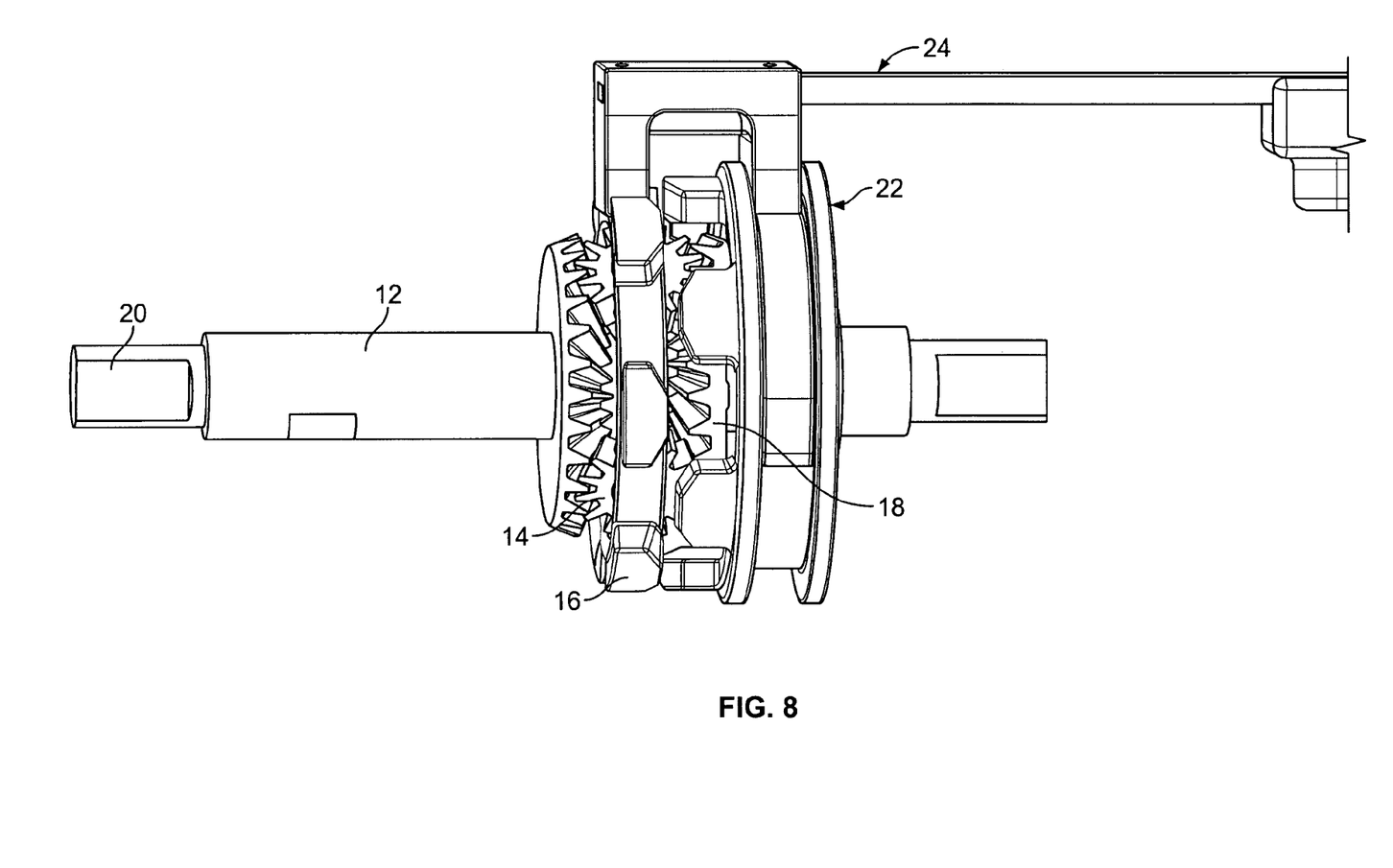
FIG. 8 is a schematic view of the transmission system in the "reverse" position.
Figure 8A:
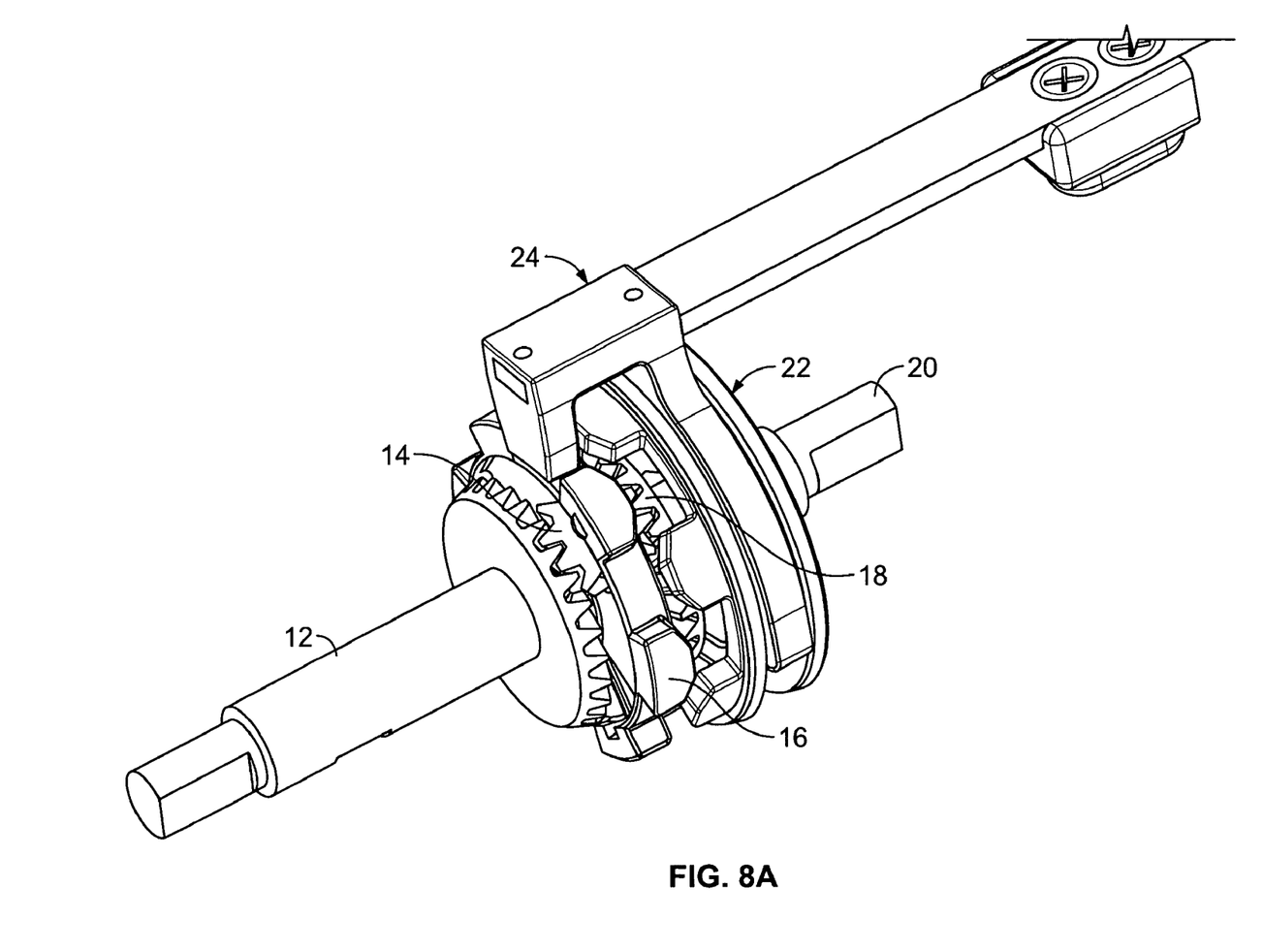
FIG. 8A a perspective view of the transmission system in the "reverse" position.

FIG. 9 illustrates one embodiment of the invention, where power is transferred from a power input 38 such as a battery-powered motor or a glow engine to the drive gear 12 via a first speed gear 13 and a second speed gear 15. As shown in FIGS. 3-6, the drive gear 12 is capable of engaging at least one transfer gear 14 which is contained within a gear housing 16 and is secured by a transfer gear pin 26 (shown in FIG. 2). In a preferred embodiment, the drive gear 12 and the at least one transfer gear 14 are beveled gears, as depicted in FIGS. 7-8A.

In an embodiment, the at least one transfer gear 14 is one of a plurality of transfer gears. For example, as shown in FIGS. 1-8A, when the transmission 10 is used in a model vehicle, the at least one transfer gear 14 may be one of three transfer gears located in the gear housing 16. Depending on the size of the vehicle, however, additional transfer gears 14 may used without departing from the scope and spirit of the invention. For example, the at least one transfer gear 14 may be one of fourteen transfer gears when an embodiment of the present invention is used on a full-scale vehicle. In still another embodiment, a bushing 36 may also be positioned within the gear housing 16.

Figure 2:
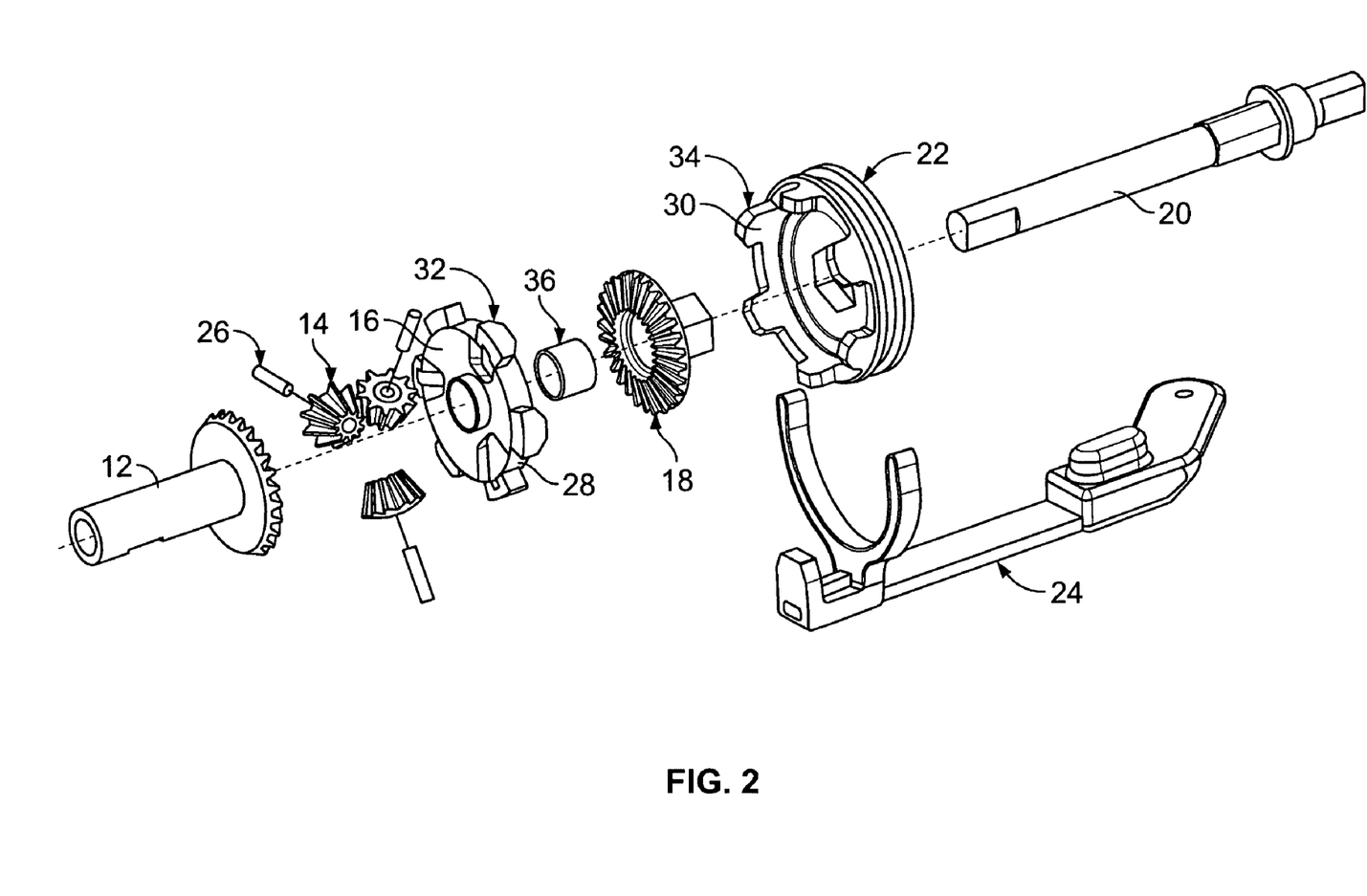
FIG. 2 is an exploded view of the transmission system.
Figure 3:
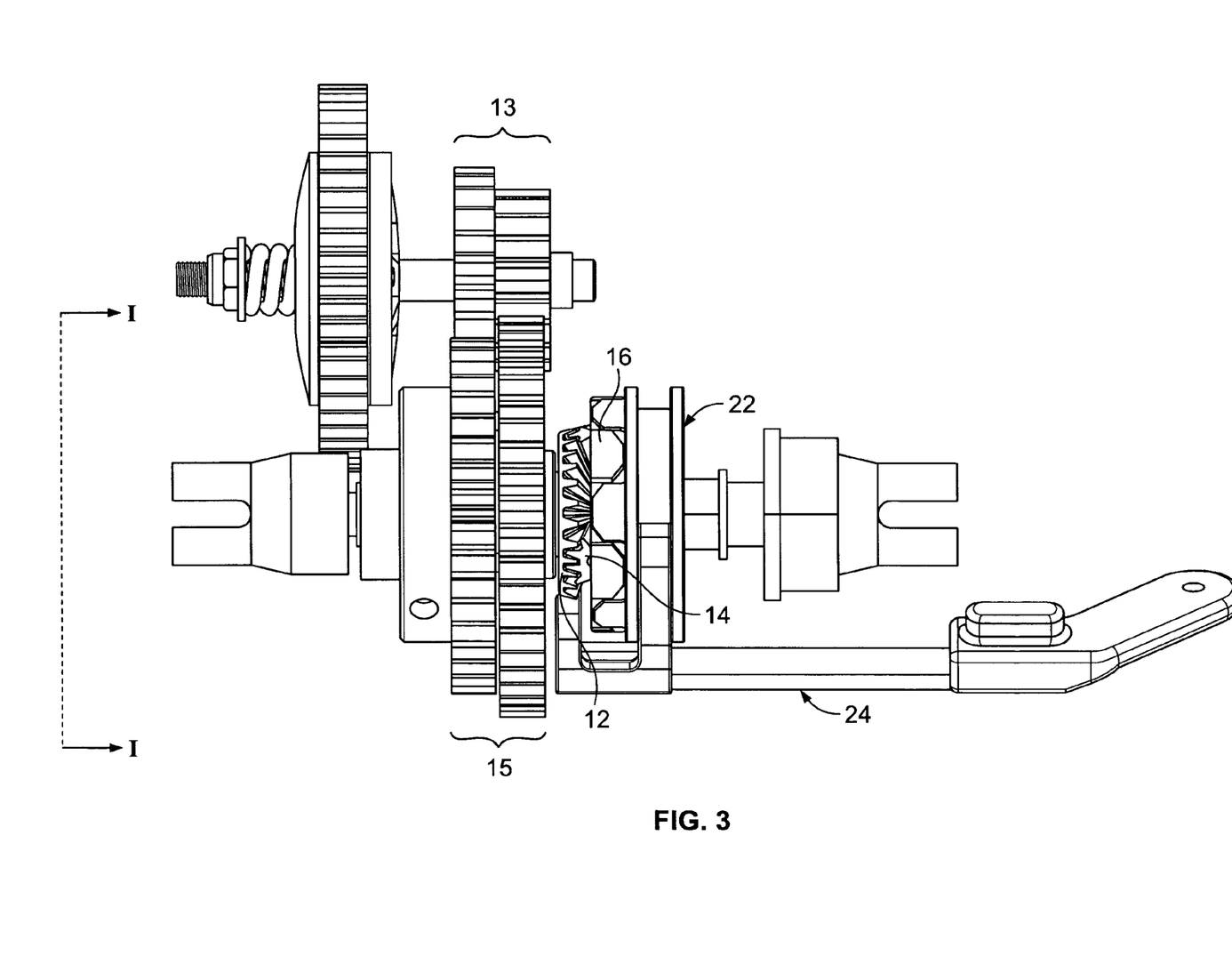
FIG. 3 is a perspective view showing the gearing of the transmission system in the "forward" position.
Figure 4:
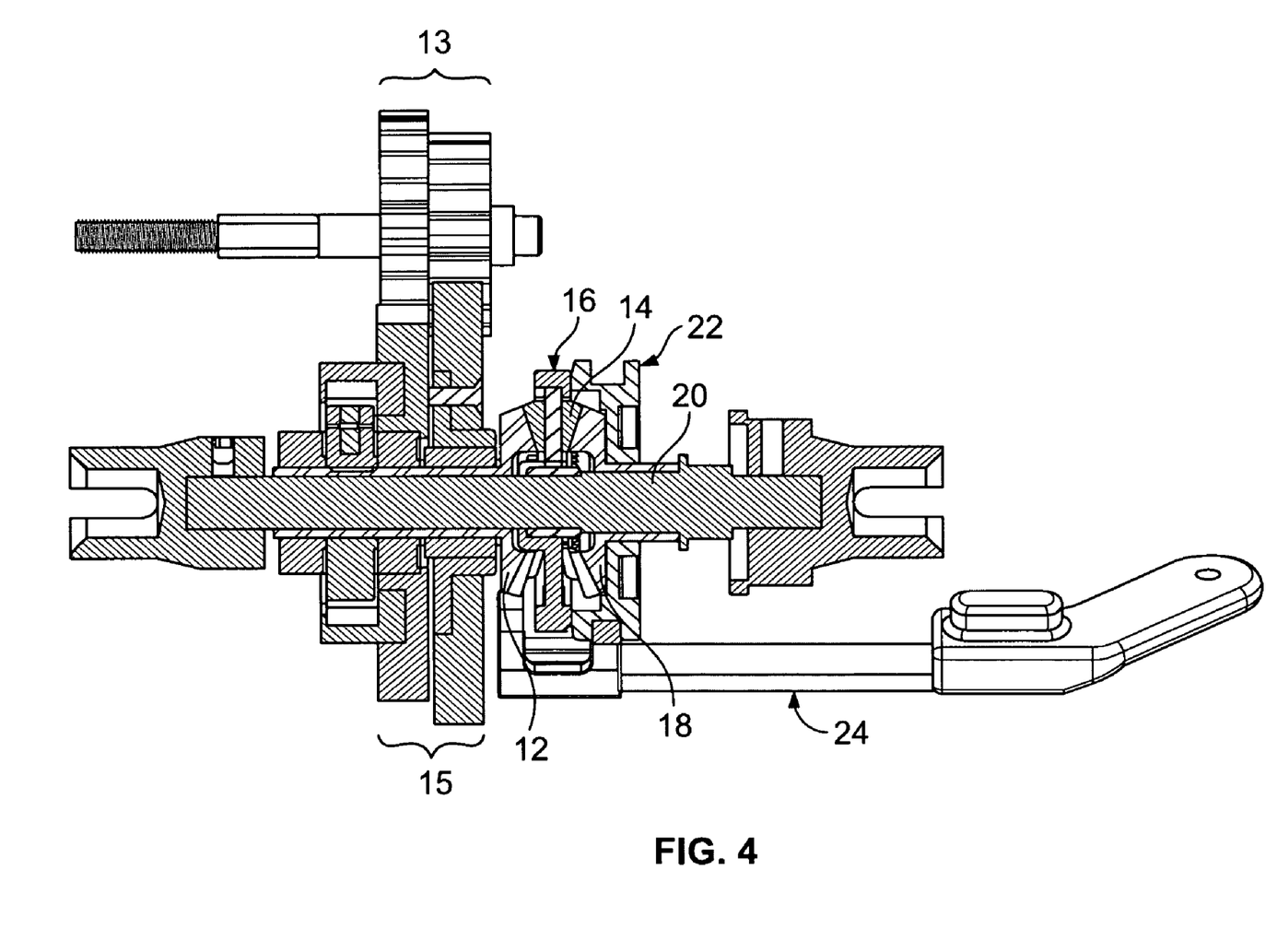
FIG. 4 is a sectional view of the transmission system in the "forward" position taken along line I-I of FIG. 3.
Figure 5:
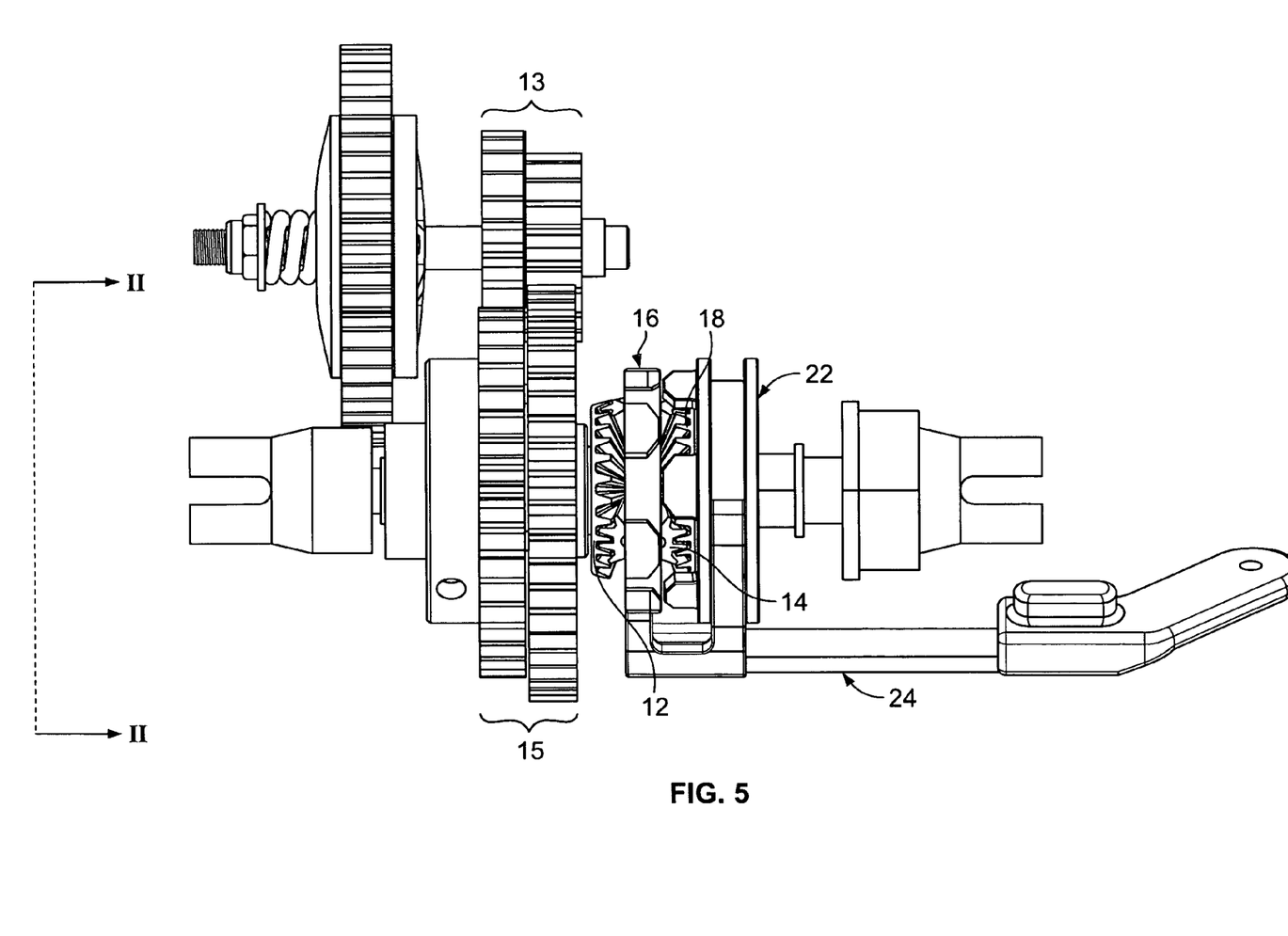
FIG. 5 is a perspective view showing the gearing of the transmission in the "reverse" position.
Figure 6:
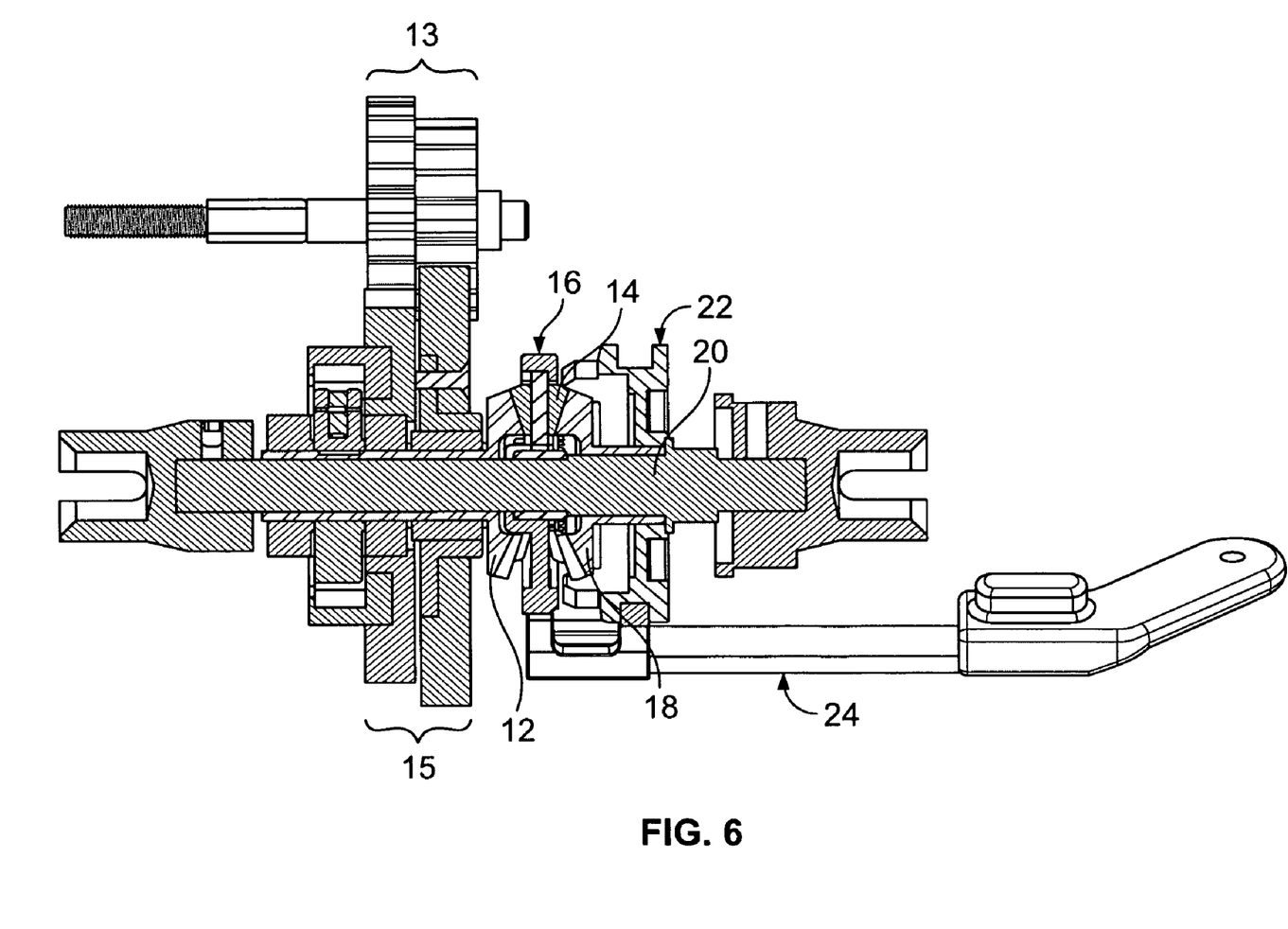
FIG. 6 is a sectional view of the transmission system in the "reverse" position taken along line II-II of FIG. 5.

The output gear 18 is also capable of engaging the at least one transfer gear 14. As illustrated in FIG. 2, in a preferred embodiment, the output gear 18 is a beveled gear. The output gear 18 is coupled to an output shaft 20.

In one embodiment, the output shaft 20 is in mechanical communication with a vehicular drive system on a model automobile. This may be accomplished in any known manner, including, as shown in FIG. 9, by having the output shaft 20 in mechanical communication with a vehicular drive system comprising at least one driveshaft 40 which is in mechanical communication with the wheels 44, 46, 48, 50 on an automobile.

Figure 1:
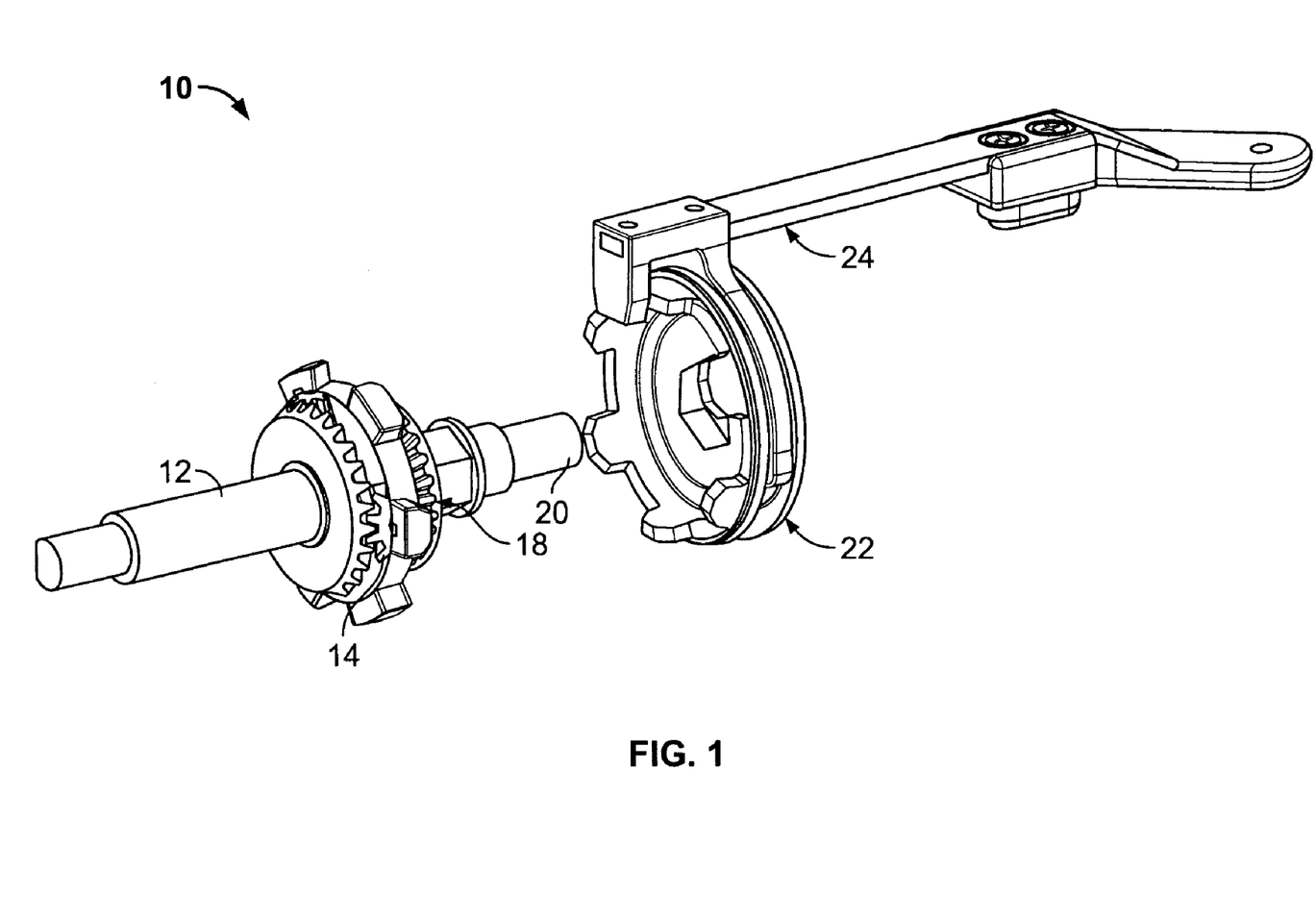
FIG. 1 is a perspective view of one embodiment of the transmission system.

FIGS. 1 and 2 illustrate an embodiment in which the drive gear 12, the gear housing 16, the output gear 18, and the locker ring 22 each define an opening capable of receiving the output shaft 20.

FIG. 9 illustrates an embodiment in which the at least one driveshaft 40 is coupled to the front wheels 44, 46 of a vehicle through a pair of front axles 54, 56, and a second driveshaft 42 is coupled to the back wheels 48, 50 of the vehicle through a pair of rear axles 58, 60 such that the vehicle is a four-wheel-drive vehicle. In another embodiment, either the at least one driveshaft 40 is coupled to the front wheels 44, 46 or the at least one driveshaft 40 is coupled to the back wheels 48, 50, thus providing either a front-wheel-drive vehicle or a rear-wheel-drive vehicle, respectively.

FIGS. 7-8A show the locker ring 22 which is capable of disengaging and engaging the gear housing 16 as to allow the at least one transfer gear 14 to rotate or not rotate. In one embodiment, both the gear housing 16 and the locker ring 22 have an annular shape with an inner surface and an outer surface, and the outer surface 28 of the gear housing 16 is capable of engaging the inner surface 30 of the locker ring 22. In a more specific version of this embodiment, the locker ring 22 and the gear housing 16 both have locking tabs 32, 34, as shown in FIG. 2, which may be interlocked in order to engage the locker ring 22 with the gear housing 16, as shown in FIGS. 5-6 and 8-8A.

As shown in FIGS. 1 and 2, the output gear 18 is keyed to the locker ring 22, thus ensuring that the output gear 18 and the locker ring 22 always rotate in the same direction. In addition, the output shaft 20 is keyed to the output gear 18, thereby causing the output shaft 20 to always rotate in the same direction as the locker ring 22. Herein, the term keyed is used to describe the relationship between two components that are integral to each other in that one cannot move without also moving the other.

When in operation, a shift lever assembly 24, e.g., a shift fork assembly, is used to select either a forward or a reverse direction of travel. The shift lever assembly 24 is coupled to the locker ring 22 and is capable of engaging the gear housing 16, as shown in FIGS. 5, 6, 8 and 8A.

As shown in FIGS. 3, 4, 7 and 7A, when the shift lever assembly 24 is moved to the "forward" drive position, the shift lever assembly 24 disengages the gear housing 16, thereby allowing the locker ring 22 to engage to the gear housing 16, thereby preventing the at least one transfer gear 14 from rotating. Because the gear housing 16 is engaged with the locker ring 22, the gear housing 16 and the locker ring 22 now rotate in the same direction as the drive gear 12. Since the output gear 18 and the output shaft 20 rotate in the same direction as the locker ring 22, the output shaft 20 will rotate in the same direction as the drive gear 12, thereby resulting in a "forward" drive for the vehicle.

When the shift lever assembly 24 is moved to the "reverse" position, as shown in FIGS. 5, 6, 8, and 8A, the shift lever assembly 24 engages the gear housing 16 and prevents the housing 16 from rotating. As a result, the at least one transfer gear 14 contained within the gear housing 16 will rotate. This causes the output gear 18 to rotate in a direction opposite the direction of rotation for the drive gear 12. Since the output shaft 20 rotates with the output gear 18, the output shaft 20 will rotate in the opposite direction as the drive gear 12, thereby causing the vehicle to travel in the "reverse" direction.

In an embodiment, the gear components are plastic. In another embodiment, they are made of metal. For example, the gear components may be made of steel. The gear components can be manufactured using known methods. For example, the components may be cast or machined. For example, a CNC machine may be used to form the components.

The invention also involves a method for changing a direction of travel on a vehicle. The method is comprised of: (1) providing a power input to a transmission assembly 10 having a drive gear 12 coupled to a gear housing 16 which contains at least one transfer gear 14, the at least one transfer gear 14 coupled to an output gear 18, the output gear 18 coupled to an output shaft 20, and a locker ring 22 coupled to a shift lever assembly 24, the shift lever assembly 24 capable of engaging the gear housing 16; (2) moving the shift lever assembly 24 to select a forward direction of travel and thereby causing the locker ring 22 to engage the gear housing 16 such that the at least one transfer gear 14 housed within the gear housing 16 does not rotate, and, as a result, the output shaft 20 rotates in the forward direction of travel; and (3) moving the shift lever assembly 24 to select a reverse direction of travel and thereby causing the locker ring 22 to disengage the gear housing 16 and the shift lever assembly 24 to engage the gear housing 16, thus allowing the at least one transfer gear 14 housed within the gear housing 16 to rotate, which results in the output shaft 20 rotating in the reverse direction of travel.

In an embodiment, the at least one transfer gear 14 is a bevel gear. In another embodiment, the shift lever assembly 24 is a shift fork assembly. In yet another embodiment, the gear housing 16 and the locker ring 22 contain locking tabs 32, 34 so that they may be engaged to each one another. In still another embodiment, the power input is an internal combustion engine. In an embodiment, the vehicle is a model vehicle. In a further embodiment, the model vehicle is a radio-controlled model automobile. In still another an embodiment, the present invention is used with a full-scale vehicle by increasing the number of transfer gears accompanying the at least one transfer gear 14.

The invention also relates to a system for controlling a direction of travel of a vehicle. The system is comprised of: (1) means for providing power to a transmission drive; (2) means for generating an output of the transmission drive to a vehicular drive system; (3) means for changing the direction of rotation of the output of the transmission drive to a vehicular drive system; and (4) power transfer means for engaging the transmission output with the transmission drive such that power may be transferred from the transmission drive to the transmission output, wherein the power transfer means comprises: (a) at least one input gear, (b) at least one output gear which engages means for generating an output of the transmission drive to a vehicular drive system, (c) at least one transfer gear which is in mechanical communication with the input gear and the output gear, and (d) a locking mechanism which selectively engages and disengages a housing containing the at least one transfer gear such that the at least one transfer gear causes the output gear to rotate in a reverse direction when the system is in a reverse mode and the at least one transfer gear causes the output gear to rotate in a forward direction when the system is in a forward mode.

In one embodiment of the invention, the vehicle in which the transmission is used is a model vehicle. In another embodiment, the vehicle is a radio-controlled model automobile. In yet another embodiment, the vehicle is a full-scale vehicle.

In an embodiment, the at least one transfer gear which is part of the power transfer means is capable of causing a rotation of the output gear in the opposite direction of the rotation of the input gear when the locking mechanism prevents the output gear, the at least one transfer gear, and the input gear from being locked together. In another embodiment, the at least one transfer gear is a bevel gear.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A transmission assembly for a vehicle, the assembly comprised of:
    at least one transfer gear capable of engaging a drive gear, the at least one transfer gear being a beveled gear contained within a gear housing;
    an output gear coupled to an output shaft, the output gear capable of engaging the at least one transfer gear;
    a locker ring capable of receiving the output gear; and
    a shift lever assembly coupled to the locker ring, the shift lever assembly capable of engaging the gear housing.

2. The transmission assembly of claim 1, wherein the shift lever assembly is a shift fork assembly.

3. The transmission assembly of claim 1, wherein the vehicle is a radio-controlled model automobile.

4. A transmission assembly for a vehicle, the assembly comprised of:
    at least one transfer gear capable of engaging a drive gear, the at least one transfer gear contained within a gear housing, the gear housing having an annular shape with an inner surface and an outer surface;
    an output gear coupled to an output shaft, the output gear capable of engaging the at least one transfer gear;
    a locker ring capable of receiving the output gear and being engaged with the gear housing, the locker ring having an annular shape with an inner surface and an outer surface; and
    a shift lever assembly coupled to the locker ring, the shift lever assembly capable of engaging the gear housing.

5. The transmission assembly of claim 4, wherein the outer surface of the gear housing is capable of engaging the inner surface of the locker ring.

6. The transmission assembly of claim 4, wherein the gear housing has locking tabs spaced apart from one another and extending from the outer surface of the gear housing;
    the locker ring has locking tabs spaced apart from one another and extending from the outer surface of the locker ring; and
    the locking tabs of the gear housing interlock with the locking tabs of the locker ring, thereby engaging the gear housing with the locker ring.

7. The transmission assembly of claim 4, wherein the shift lever assembly is a shift fork assembly.

8. The transmission assembly of claim 4, wherein the vehicle is a radio-controlled model automobile.

9. A method for changing a direction of travel on a vehicle, the method comprising:
    providing a power input to a transmission assembly having a drive gear coupled to a gear housing which contains at least one transfer gear, the at least one transfer gear being a bevel gear coupled to an output gear, the output gear coupled to an output shaft, and a locker ring coupled to a shift lever assembly, the shift lever assembly capable of engaging the gear housing;
    moving the shift lever assembly to select a forward direction of travel;
    engaging the locker ring to the gear housing;
    locking the at least one transfer gear into position, thereby preventing the at least one transfer gear from rotating;
    rotating the output shaft in the forward direction of travel;
    shifting the shift lever assembly to select a reverse direction of travel;
    disengaging the locker ring from the gear housing;
    engaging the shift lever assembly to the gear housing;
    freeing the at least one transfer gear to rotate; and
    rotating the output shaft in the reverse direction of travel.

10. The method of claim 9, wherein the shift lever assembly is a shift fork assembly.

11. The method of claim 9, wherein the gear housing and the locker ring contain locking tabs for engaging together.

12. The method of claim 9, wherein the power input is an internal combustion engine.

13. The method of claim 9, wherein the vehicle is a radio-controlled model automobile.

* * * * *